United States Patent

Martini

[11] 3,917,724
[45] Nov. 4, 1975

[54] PROCESS FOR PREPARING OLIGOMERS OF HEXAFLUOROPROPENE

[75] Inventor: Thomas Martini, Neuenhain (Taunus), Germany

[73] Assignee: Hoechst Aktiengesellschaft, Frankfurt (Main), Germany

[22] Filed: Apr. 23, 1974

[21] Appl. No.: 463,389

Related U.S. Application Data

[63] Continuation-in-part of Ser. No. 440,568, Feb. 7, 1974, abandoned.

[30] Foreign Application Priority Data

Feb. 9, 1973 Germany............................ 2306439
Jan. 10, 1974 Germany............................ 2401018

[52] U.S. Cl.... 260/653.1 R; 252/426; 260/583 GG; 260/584 C
[51] Int. Cl.²......................................... C07C 17/26
[58] Field of Search .... 260/653.1 R, 653.1 T, 653.3

[56] References Cited
UNITED STATES PATENTS 2,918,501 12/1959 Brehmetal......................... 260/653.3
2,983,764 5/1961 Knaack ........................ 260/653.1 R

*Primary Examiner*—Daniel D. Horwitz
*Attorney, Agent, or Firm*—Curtis, Morris & Safford

[57] ABSTRACT

Hexafluoropropene is oligomerized in the presence of fluorine-containing tertiary amines having the formula

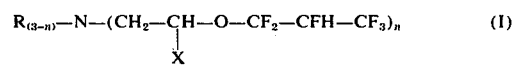 (I)

wherein $n$ represents an integer from 1 to 3, X is hydrogen or $CH_3$ and R represents identical or different, straight-chain, branched or cyclic alkyl groups having from 1 to 12 carbon atoms or, if $n$ is 2, represents the group

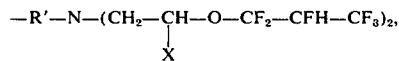

wherein R' represents an alkylene group within the range specified for R. The $C_6F_{12}$, $C_9F_{18}$, $C_{12}F_{24}$ and $C_{14}F_{26}$ oligomers are valuable compounds for the electrofluorination to yield perfluorinated alkanes or are suitable as inert or isolating liquids, cooling agents, hydraulic liquids or solvents.

16 Claims, No Drawings

PROCESS FOR PREPARING OLIGOMERS OF HEXAFLUOROPROPENE

The present application is a continuation-in-part application of our application Ser. No. 440.568 filed Feb. 7, 1974.

The present invention relates to a process for preparing oligomers of hexafluoropropene.

The preparation of oligomers of hexafluoropropene, especially of the dimers ($C_6F_{12}$) and of the trimers ($C_9F_{18}$) has been described recently several times. The process according to U.S. Patent 2,918,501 provides for operating in autoclaves at temperatures from 100° to 200°C in an aprotic solvent with halides or hydroxides of the first main group of the periodic system and with quaternary ammonium compounds as catalysts.

When using $KHF_2$ as catalyst, oligomerization is successful under reduced pressure at a room temperature of +28°C. U.S. Patent 2,983,764 describes oligomerization with tetrakis-(dimethylamino)-ethylene or tetramethylguanidine at reaction temperatures of from 50° to 200°C. A summary description published in "Fluorine Chemistry Reviews" 1 (2) 359 – 397 (1967) concerns $F^{(-)}$- initiated, carbanionic oligomerization of hexafluoropropene. As per "Chem.Comm." 1444 (1970) an oligomerization in the presence of trimethylamine is feasible at 28°C within a reaction period of 75 hours.

All these processes present the inconvenience that always mixtures of dimers and trimers are obtained which include high portions of both these components.

Moreover, when choosing shorter residence periods of about 1 hour the applied reaction temperatures must be high (up to 200°C), respectively the application of low temperatures implies long residence periods (75 hours). The reactions are mostly performed in autoclaves resulting in a limited space/time yield.

Now a process for oligomerizing hexafluoropropene has been found, which comprises carried out the oligomerization in the presence of fluorine-containing tertiary amines having the formula

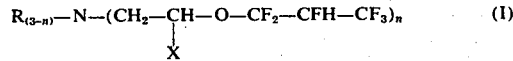  (I)

wherein n represents an integer from 1 to 3, X is hydrogen or $CH_3$ and R represents identical or different, preferably identical, straight-chain or branched or cyclic, preferably, however, straight-chain, alkyl groups having from 1 to 12, preferably from 1 to 8, especially from 1 to 4 carbon atoms or, if n is 2, represents the group

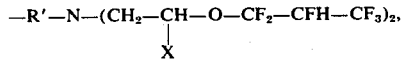

wherein R' represents an alkylene group within the range specified for R, particularly the ethylene group, the tetra-methylene-group or the hexa-methylene group. There may also be used mixtures of the compounds having formula I.

Especially suitable for the process according to the invention are the following compounds having formula I:

tris-[β-(2H-hexafluoropropoxy-ethyl)]-amine
di-[β-(2H-hexafluoropropoxy-ethyl)]-methylamine, -ethylamine -n-propylamine, -isopropylamine, -n-butylamine, -isobutylamine, -n-hexylamine, -cyclohexylamine, -isononylamine, -n-dodecylamine,
mono-[β-(2H-hexafluoropropoxy-ethyl)]-dimethylamine, -diethylamine, -methylethylamine, -di-n-propylamine, -di-n-butylamine, -methyl-n-butylamine, -ethyl-n-hexylamine, -di-nonylamine, -methyl-dodecylamine, -methyl-cyclohexylamine, -tetra-[β-(2H-hexafluoropropoxy-ethyl)]-ethylene-diamine, -tetra-methylene-diamine, -hexamethylene-diamine,
and the corresponding mono-, di- und tri-[β-(2H-hexafluoropropoxy-isopropyl)]-amines or tetra-[β-(2H-hexafluoropropoxyisopropyl)]-ethylene-diamine, -tetramethylene-diamine, -hexamethylenediamine.

Preference is given among the above-mentioned compounds to those wherein n = 2 or = 3.

The tertiary amines having formula I may be prepared easily and with good yields according to our copending application Ser. No. 440,569 (German Appl. P 2306464) filed concurrently with copending Parent application Ser. No. 440,568 by reacting the corresponding ethanolamines with hexafluoropropene in the presence of tertiary alkylamines.

Oligomerization may be performed at temperatures from −20° to +100°C. Higher temperatures are possible, but they do not contribute any advantage. Preferred reaction temperatures are from 0° up to 90°C, especially from +20° to +60°C.

For the sake of simplicity, the reaction is performed at atmospheric pressure, but pressures of e.g. up to 10/atm. gauge, especially 5 atm. gauge are possible, in case it is decided to operate in a pressure-proof system.

Oligomerization of hexafluoropropene may be performed in a very simple manner by first introducing preferably while stirring, hexafluoropropene into an amine of formula I at reaction temperature, the stirring being carried out in usual manner, e.g. either mechanically by a stirring device or by the bubbles of the gaseous hexafluropropene in case that the latter is introduced in its gaseous state. It is useful to introduce the hexafluoropropene in proportion to its being used up, the dosage speed depending on the reaction temperature, the quantity of amine having formula I and on the equipment involved in the process. Unreacted propene may be recycled to the reaction zone in known manner.

The amine having formula I is preferably used in an aprotic, especially polar solvent. For this process the concentration proportions of amine to solvent are not of critical importance. Solvents with a content of 1% by volume of amine having formula I are still appropriate for oligomerizing hexafluoropropene; naturally, the conversion rate per time unit is lower in diluted solution.

The following solvents are suitable inter alia, acetonitrile, propionitrile and higher nitriles, dimethyl formamide, dimethyl sulfoxide, ethers such as diisopropyl ether, glycol dimethyl ether, tetrahydrofurane, dioxane, esters such as ethyl acetate, dimethyl phthalate, furthermore dimethyl acetamide, phosphoric acid-tris-dimethylamide and -tris-diethylamide, benzene, toluene, fluorobenzene, benzotrifluoride, chlorobenzene, nitrobenzene, the amine of formula I itself, and others.

Optionally, it is also possible to add to the reaction mixture a trialkylamine for accelerating the oligomerization and directing the process to trimerization. The proportion of amine having formula I to trialkylamine is, generally, not of essential importance, convenient mixtures consist of 1:10 to 10:1, especially 1:3 to 3:1 parts by weight. Suitable trialkylamines are particularly those, the alkyl groups of which have from 1 to 6, preferably from 2 to 4 carbon atoms, which alkyl groups may be linear, branched or even cyclic, preferably linear, identical or different, preferably identical. Moreover, two alkyl groups may form a ring with 4 to 5 carbon atoms. Compounds which are considered are, for example, trimethylamine, triethylamine, tri-n-propylamine, tri-n-butyl-amine, N,N,N', N'-tetramethylethylene-diamine, -hexamethylene diamine or diazobicyclo [2.2.2]-octane, or even aromatic amines such as pyridine. Particularly well appropriate is triethylamine.

The oligomers of hexafluoropropene obtained constitute in general a heavy phase which may be isolated in known manner, for example by separation. The other phase which contains the reaction solution, especially the amines, may be re-used for further oligomerizations.

The process can easily be arranged for continuous operation, for example, by separating the oligomers at the rate of their formation. A preferred embodiment consists in introducing hexafluoropropene in finely dispersed state through a frit into the reaction solution containing amine of formula I, while the reaction solution is in a vertical tube which may as well be filled with inert filling bodies. It is also possible to arrange for hexafluoropropene and the reaction solution to travel in a counter-current flow through a column, the separation being performed continuously, and the reaction solution being fed back continuously into the reaction zone.

Suitable reactor materials are all sufficiently inert materials, such as steel, nickel or copper, graphite, preferably glass.

Another preferred embodiment of the process according to the invention consists in introducing e.g. at room temperature hexafluoropropene, according to Ser. No. 440,569, into the solution of an alkanolamine from which the amine of formula I is derived. The solution contains a trialkylamine and an aprotic polar solvent. The amine of formula I is obtained in situ; and, after saturation of the OH groups in the alkanolamine and, in introduction of further hexafluoropropene, the oligomer separates upon saturation. Since both reactions are exothermic, cooling is of advantage. The reaction temperature desired for the oligomerization can be adjusted by specific dosing of hexafluoropropene. The crude oligomers may be purified further in known manner, for example, by fractional distillation or chromatography; for that purpose a preliminary washing with one of the above mentioned organic solvents, water, or diluted acid may be advantageous for eliminating amine residues.

The oligomers according to the invention are generally and mainly the trimers of hexafluoropropene. An addition of merely 5 mol.-% - calculated on the amine of formula I - suffices for reducing considerably or preventing almost entirely the formation of dimers. Tetramers and fractions of higher condensed portions are formed to a small extent only (< 10 %).

The present invention offers the special advantage that by using tris-[β-(2H-hexafluoropropoxy-ethyl)]-amine as compound having formula I dimeric or trimeric hexafluoropropene may be obtained as desired: for obtaining preferably dimeric hexafluoropropene a pure tris-[β-(2H-hexafluoropropoxy-ethyl)]-amine is used which should be, as far as possible, devoid of other amines, especially of the tertiary alkylamine used for the preparation, whereas for preparing preferably trimeric hexafluoropropene a trialkylamine - such as described - is added. An amount of trialkyl amine of about 0.6 mol. % - calculated on the tris-[β-(2H-hexafluoropropoxy-ethyl)]-amine used - reduces the dimer portion to 70 %, and with 5 mol. % more than 80 % of trimer are obtained.

While developing further the present invention, it has been found that especially at temperatures of from 50° - 100°C the reaction of hexafluoropropene in the presence of a trialkylamine in a weight proportion of 1:10 to 10:1 (calculated on the fluorine-containing tertiary amine) can be performed in such a way that the portion of the tetramer $C_{12}F_{24}$ and of the compound $C_{14}F_{26}$ is particularly important.

All the amines previously mentioned may be used as trialkylamines. Particularly good results are obtained with triethylamine. A weight proportion of trialkylamine to fluorine-containing amine of 1:3 to 3:1 is preferred. The best temperature range is from 60° - 80°C. The use of a high polar aprotic solvent (for example dimethyl formamide, phosphoric acid trisdimethylamide or dimethyl sulfoxide) and as a trialkylamine the use of diazobicyclo-[2.2.2]-octane yields a particularly high proportion of $C_{14}F_{26}$ compound. Tris-[β-(2H-hexafluoropropoxyethyl)]-amine proved to be an especially suitable fluorine-containing tertiary amine.

It is useful to keep the formed oligomer mixture in the reaction zone during all of the reaction period when the compounds $C_{12}F_{24}$ and $C_{14}F_{26}$ are desired. Vigorous stirring of the reaction system is required.

The upper limit for the speed at which hexafluoropropene is to be introduced into the amine solution, is set only by the speed at which the reaction heat produced may be removed, the lower limit is set by technical considerations, hexafluoropropene is generally introduced at speeds between 400 and 20 g/lh, but preferably 200 to 40 g/lh - calculated on the volume of the initial solution.

The process produces considerable fractions of fluorocarbons having a boiling point of above 160°C (boiling point of the trimer 110° - 115°C). The fraction boiling at temperatures between 160° and 182°C contains the tetrameric hexafluoropropene having a boiling point of from 168° - 169°C and to which may be assigned the formula of a tris-perfluoroisopropyl-trifluoromethyl-ethylene $C_{12}F_{24}$).

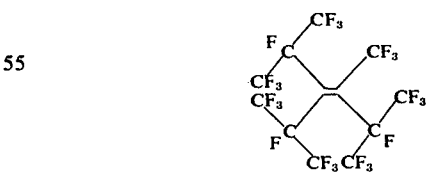

A compound having the same empirical formula, but an unknown structure, could be obtained in minor quantities by exposing hexafluoropropene to light for 6 weeks at 170°C (cf. R. N. Haszeldine, J. Chem. Soc. 1953, 3559).

The fraction boiling at temperatures between 160° and 182°C contains, in addition to tris-perfluoroisopropyl-trifluoromethyl-ethylene, fluorocarbons having the formula $C_{14}F_{26}$ which may be imagined as a result of $CF_4$ being split off from pentameric hexafluoropropene.

This variation possibility to obtain a larger proportion of one or the other oligomer, as desired, is not only a great advantage, but also a surprise.

The oligomers of hexafluoropropene ($C_6F_{12}$, $C_9F_{18}$, $C_{12}F_{24}$) as well as the compound $C_{14}F_{26}$ are valuable compounds which may be used as starting materials for the electrofluorination to yield perfluorinated alkanes and which may also serve directly as inert or isolating liquids, cooling agents, hydraulic liquids or solvents.

The following examples illustrate the invention:

EXAMPLE 1

149 g of triethanolamine and 200 g of dried triethylamine are dissolved in 800 ml of absolute acetonitrile in a 2 ltr three necked flask, equipped with stirring means, thermometer, high efficiency cooler (−78°C) gas introduction tube and outlet socket; while stirring vigourously hexafluoropropene is introduced in such a way that all the fluorolefine is absorbed immediately (abt. 200 g/hour). During this processing step the temperature climbs to 45° – 50°C. The oligomer phase starts separating after having introduced abt. 600 g of hexafluoropropene. Depending on the dosage of the hexafluoropropene current, the reaction temperature adjusts between +30° and +50°C. It is an advantage to set the gas current in such a way that a minor reflux of hexafluoropropene is formed. The oligomer mixture which is separating, is eliminated from the reaction solution from time to time without ever interrupting the reaction. At a temperature of 48°C 425 g/h of oligomer are formed. The reaction is quantitative. The crude oligomer is shaken with acetonitrile so as to free it of dissolved triethylamine or tris-[β-(2H-hexafluoropropoxy-ethyl)]-amine. The latter may be recycled after having eliminated the solvent.

Gas chromatographic separation by composition of the oligomer:

| | |
|---|---|
| monomeric hexafluoropropene | 1.4 % |
| dimeric hexafluoropropene | 0.6 % |
| trimeric hexafluoropropene | 92.4 % |
| fraction with higher oligomerization degree | 5.6 % |

The work-up is performed by distillation.

EXAMPLE 2

In a 2 ltr three necked flask, equipped with stirring means, thermometer, high efficiency cooler (-78°C), gas introduction tube and outlet socket, 200 g of tris-[β-(2H-hexafluoropropoxyethyl)]-amine, purified by column chromatography (stat.phase: silica gel neutral, 0.063 – 0.2 mm; mobile phase: acetic ester: petroleum ether, boiling point 75° – 100°C, 1:1), are dissolved in 400 ml of dried acetonitrile. A quantity of about 70 – 100 g of hexafluoropropene has to be introduced before the oligoner starts to separate. The temperature in the flask climbs to 28° – 30°C. The dosage is adjusted so as to prevent the beginning reflux from cooling the temperature in the flask below +26°C.

The separated oligomer is worked-up according to example(1). Dimerization of 80 g/h is possible.

Gas chromatographic separation by composition of the oligomer:

| | |
|---|---|
| monomeric hexafluoropropene | 0.7 % |
| dimeric hexafluoropropene | 90.6 % |
| trimeric hexafluoropropene | 8.3 % |
| fraction with higher oligomerization degree | 0.5 % |

EXAMPLE 3

The reaction is carried ont according to example 2. In addition and prior to introducing hexafluoropropene into the reaction solution there is further added 1 g of diazobicyclo [2.2.0]octane.

Gas chromatographic separation by composition of the oligomer thus obtained:

| | |
|---|---|
| monomeric hexafluoropropene | 3.3 % |
| dimeric | 70.5 % |
| trimeric | 25.0 % |
| fraction with higher oligomerization degree | 1.1 % |

EXAMPLE 4

150 g of N,N,N',N', -tetrahydroxyethylhexamethylene diamine

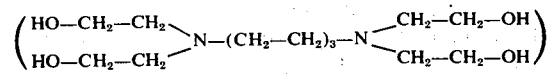

are dissolved in a 3 necked flask - according to the description given for example 1 in 500 ml of dried acetonitrile and mixed with 250 g of triethylamine.

For saturating the OH-groups about 400 g of hexafluoropropene are introduced. A further addition of $C_3F_6$ involves formation and separation of oligomers which are worked up according to example (1).

Gas chromatographic composition of the oligomer:

| | |
|---|---|
| monomeric hexafluoropropene | 1.2 % |
| dimeric hexafluoropropene | 0.7 % |
| trimeric hexafluoropropene | 97.3 % |
| fractions of higher oligomerization degree | 0.8 % |

EXAMPLE 5

Hexafluoropropene is introduced at a reaction temperature of 35°C into an apparatus according to example 1 containing a solution of 200 g of N-di-n-butyl-ethanolamine in 400 ml of $CH_3CN$ and 200 ml of triethylamine.

Oligomer is separating after addition of 457 g of fluorolefin. Gas chromatographic separation by composition:

| | |
|---|---|
| monomeric hexafluoropropene | 4.1 % |
| dimeric hexafluoropropene | — |
| trimeric hexafluoropropene | 95.9 % |

EXAMPLE 6

Hexafluoropropene is introduced at a reaction temperature of from 36° – 40°C in an apparatus according to example (1) containing a solution of 85 g of N-n-butyl-diethanolamine in 125 ml of $CH_3CN$ and 125 ml of triethylamine. The oligomer which separates after etherification of the OH-groups has the following gas chromatographic fractions by composition:

| | |
|---|---|
| monomeric hexafluoropropene | 2.8 % |
| dimeric hexafluoropropene | — |

-continued

| | |
|---|---|
| trimeric hexafluoropropene | 89.4 % |
| fraction of higher oligomerization degree | 8.7 % |

EXAMPLE 7

Hexafluoropropene is introduced at a reaction temperature of from 33° – 35°C in the apparatus described in example 1 containing 180 g of di-[β-(2H-hexafluoropropoxy-ethyl)]-n-butylamine (purified chromatographically according to example 2). The separating oligomer has the following gas chromatographic fractions by composition:

| | |
|---|---|
| monomeric hexafluoropropene | 2.8 % |
| dimeric hexafluoropropene | 74.1 % |
| trimeric hexafluoropropene | 21.8. % |
| fraction of higher oligomerization degree | 1.2 % |

EXAMPLE 8

1,7 g of triethylamine = 5.04 mol.% are added to 200 g of tris-[β-(2H-hexafluoropropoxy-ethyl)]-amine, dissolved in 150 ml of $CH_3CN$. While introducing hexafluoropropene the temperature climbs to 39°C.

The oligomer produced during this process shows the following gas chromatographic fractions by composition:

| | |
|---|---|
| monomeric hexafluoropropene | 1.7 % |
| dimeric hexafluoropropene | 8.9 % |
| trimeric hexafluoropropene | 83.9 % |
| fraction of higher oligomerization degree | 5.0 % |

The same experiment performed with triethylamine in a concentration of 50 mol.%, shows the following results:

| | |
|---|---|
| monomeric hexafluoropropene | 3.2 % |
| dimeric hexafluoropropene | 2.6 % |
| trimeric hexafluoropropene | 86.9 % |
| fraction of higher oligomerization degree | 7.4 % |

EXAMPLE 9

A solution of 7,5 g of tris-[β-(2H-hexafluoropropoxy-ethyl)]-amine in 200 ml of $CH_3CN$ (0,0625 molar) is introduced in a glass flask previously rinsed with hexafluoropropene, whereby the temperature climbs immediately to 32°C. For about 15 minutes an excess amount of hexafluoropropene is conducted through the solution. The separating oligomer has the following gas chromatographic fractions by composition:

| | |
|---|---|
| monomeric hexafluoropropene | 0.6 % |
| dimeric hexafluoropropene | 91.0 % |
| trimeric hexafluoropropene | 8.3 % |

EXAMPLE 10

150 g of triethanolamine, 500 ml of acetonitrile and 350 ml of triethylamine are first introduced into a 4 ltr. three necked flask equipped with stirring means, thermometer, reflux condenser and outlet socket, subsequently hexafluoropropene is introduced at 40° – 45°C for saturation of the hydroxyl groups. Whereby tris-[β-(2H-hexafluoropropoxy-ethyl)]-amine is formed which acts as catalyst. Alternatively, 600 g of this amine may be introduced from the very beginning. Hexafluoropropene is dosed in such a way that the temperature is climbing to 60°C, while partially unreacted hexafluoropropene and newly formed heptafluoropropene are escaping. The oligomer which is separating, remains in the reaction flask for the entire reaction period (18 h). Upon the separated quantity having reached 4000 grams, the oligomer is isolated, washed with water, dried and distilled. The fractions with low boiling points consist mainly of the trimers. As far as fractions with high boiling points are concerned, 808 g of a product mixture are obtained having a boiling point of about 160°C. The portion boiling at between 160° and 182°C amounts to 439 grams. The gas chromatographic composition of this fraction shows 31 % of trisperfluoroisopropyltrifluoromethylethylene as well as three different compounds of the formula $C_{14}F_{26}$ in fractions of 40,9, 7,1 and 14,8 %. The portion boiling above 182°C amount to 333 g and is eliminated in vacuo by distillation (boiling point 66°C – 108°C / 3,5 torr). This product is crystallizing partially while standing while, a residue of 36 g remaining. From the portion boiling at between 100° and 182°C the compound $C_{12}F_{24}$ may be obtained by preparative gaschromatography. It is not difficult either to obtain same by fractional distillation either from the oligomer mixture produced according to example 1, (since same is practically devoid of $C_{14}F_{26}$) or of compounds having an even higher molecular weight. The constitution of the tetramer is determined by analysis, nuclear magnetic fluorine resonance and mass spectrometric molecular weight determination.

Analysis: calc. C 24.0 %; F 76.0 %. $C_{12}F_{24}$ found C 25.1 %; F 74.7 %. Molecular weight (mass spectrometric): 581 (600-$F^{19}$), theory : 600

Mass spectrum $e_l^m$ = 581, 531, 512, 493, 443, 441 and further fractions

Nuclear magnetic fluorine resonance The following absorptions with the specified intensities have been found: $\delta$ = −164 (1), = 155(1), −148(1), −66 to 70(18), −51(3) (calculated on $CFCl_3$ as internal standard)

Refractive index $n_D^{20}$ = 1.3098

IR spectrum; (gaseous); 1653 w, 1285 ss, 1259 sh, 1251 ss, 1204 s, 1195 sh, 1164 s, 1152 sh, 1117 s, 1092 sh, 1078 s, 1003 sh, 984 s, 968 s, 748 m, 737 s, 719 m [$cm^{-1}$].

Analysis of $C_{14}F_{26}$ Mixture of the three calc. C 25.4 % F 74.6 %. isomers found C 25.1 % F 75.0 %.

Molecular weight of the individual components (mass spectometric) 662 each

EXAMPLE 11

Hexafluoropropene is introduced into a solution of 120 g of tris-(β-2H-hexafluoropropoxyethyl)-amine and 100 g of diazobicyclo (2.2.2)octane in 200 ml of dimethyl sulfoxide in such a way that the reaction temperature is climbing up to 70°C. After about 4 hrs 810 g of oligomer are separated and worked-up by distillation.

| | | | |
|---|---|---|---|
| Boiling point | 48°–105°C | 16 g | first runnings |
| Boiling point | 106°–116°C | 544 g | $C_9F_{18}$ |
| Boiling point | 116°–160°C | 84 g | intermediate fraction |
| Boiling point | 160°–182°C | 117 g | $C_{12}F_{24} + C_{14}F_{26}$ |
| | | 21 g | residue. |

EXAMPLE 12

A solution of 100 g of diazobicyclo (2.2.2)octane and 150 g of tris-[2-(2H-hexafluoropropoxy)-ethyl]-amine in 250 ml of dimethyl sulfoxide is preheated to 60°C. At that point a hexafluoropropene-current is introduced at the rate of 30 – 40 g/h. The reaction temperature of 60°C is maintained by an oil bath heated up to from 75° – 80°C. After separation of 150 g of oligomer same is washed with $H_2O$, dried over $Na_2SO_4$ and worked up by distillation. The following composition is obtained:

| Boiling point | 110°–120°C | 8 g | $C_9F_{18}$ |
|---|---|---|---|
| Boiling point | 120°–160°C | 54 g | intermediate fraction |
| Boiling point | 160°–182°C | 71 g | $C_{14}F_{26}$ |
| | | 14 g | residue. |

Examples for the preparation of fluorine-containing amines having formula I

EXAMPLE 13

75 g of triethanolamine are dissolved in 500 ml of acetonitrile and mixed with 100 ml of triethylamine in an agitator flask equipped with thermometer, gas inlet tube and a cooling device which is maintained at about 20°C. At 0°C hexafluoropropene is fed in at the rate of its consumption until the IR spectrum control does not detect any more OH bands. The reaction mixture is poured into 500 ml of ice water, the organic phase is separated, washed twice again with 500 ml of $H_2O$ and dried with $Na_2SO_4$.

Yield: 260 g (86.3 % of theory).

The product obtained can be subjected to chromatography for further purification, on neutral silica gel (0.05 – 0.2 mm; WOELM) as stationary phase and acetic acid ethylester/petroleum ether (boilg. p. 75° – 100°C) as mobile phase.

Yield: 200 g (66.5 % of theory) Boiling point: 118°C/0.6 torr. Molecular weight: calc. 599 (osmom.) found 586.

EXAMPLE 14

346 g of di-n-buthylethanolamine are dissolved in 500 ml of acetonitrile - according to example 13 - and mixed with 140 ml of triethylamine. Hexafluoropropene is fed in at 30°C until no more OH-bands can be detected by IR spectroscopic control. The reaction mixture is poured into 1 ltr of ice water, twice again washed with 1 ltr each of $H_2O$, dried over $Na_2SO_4$ and the last remnants of amine eliminated in high vacuum.

Yield: 459 g (71.1 % of theory). Yield after distillation: 339 g (52.5 % of theory). Boiling point: 52°C/0.6 torr. Molecular weight: calc. 323. (osmom.) found 318.

EXAMPLE 15

As per example (13), 332 g of n-butyl-diethanolamine are dissolved in 1 ltr. of acetonitrile and mixed with 250 ml of triethylamine. Hexafluoropropene is fed in until the OH-bands have completely dissappeared. The reaction temperature is maintained at between 5° and 10°C. The work-up is performed according to example (14).

Yield: 820 g (88 % of theory). Boiling point: 76°C/0.3 torr. Molecular weight: calc. 461. (osmom.) found 485.

EXAMPLE 16

300 g of N,N,N',N'-tetrahydroxyethyl-hexamethylene-diamine [$(HOCH_2-CH_2)_2N-(CH_2)_6-N(CH_2CH_2OH)_2$], at a concentration of about 90 %, are dissolved in 1 ltr. of acetonitrile and mixed with 300 ml of triethylamine. At 5° – 10°C hexafluoropropene is fed until no free hydroxyl group shows in the IR control spectrum control. Work-up is performed according to examples 13 and 14.

Yield: 740 g (83 % of theory). Molecular weight: calc. 892. (osmom.) found 706.

What is claimed is:

1. A process which comprises contacting hexafluoropropene at a temperature of −20° to 100°C with a fluorine-containing tertiary amine having the formula

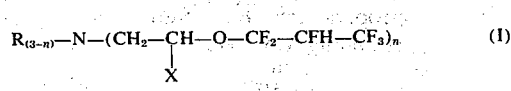

wherein n is an integer frm 1 to 3, X is hydrogen or $CH_3$ and R represents identical or different straight-chain, branched or cyclic alkyl groups of from 1 to 12 carbon atoms or, if n is 2, additionally represents the group

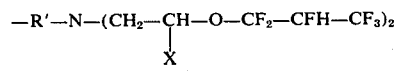

wherein R' is an alkylene group of from 1 to 12 carbon atoms.

2. The process defined in claim 1 in which R and R' are alkyl and alkylene, respectively, of 1 to 8 carbon atoms.

3. The process defined in claim 1 in which R and R' are alkyl and alkylene, respectively, of 1 to 4 carbon atoms.

4. The process defined in claim 1 in which the hexafluoropropene is contacted with a fluorine-containing tertiary amine of Formula I and a trialkylamine in a weight proportion of 1 : 10 to 10 : 1.

5. The process defined in claim 4 in which the proportion by weight is from 1 : 3 to 3 : 1.

6. Process according to claim 1, which comprises dimerizing hexafluoropropene in the presence of tris[β-(2H-hexafluoropropoxy-ethyl)]-amine in absence of other basic components.

7. Process according to claim 4, which comprises contacting hexafluoropropene at temperatures of from 50° – 100°C.

8. Process according to claim 7, which comprises the isolating the separated reaction product only after termination of the introduction hexafluoropropene.

9. Process according to claim 8, which comprises the use of triethylamine or diazobicyclo-[2,2,2]-octane as trialkylamine.

10. Process according to claim 7 which comprises the use of trialkylamine in the weight proportion of 1 : 3 to 3 : 1, calculated on the fluorine containing amine.

11. Process according to claim 7, wherein the reaction is performed at temperatures from 60° – 80°C.

12. Process according to claim 7 for the preparation of $C_{14}F_{26}$, which comprises operating in a high-polar, aprotic solvent and the use of diazobicyclo-[2,2,2]-octane as trialkylamine.

13. Process according to claim 12, which comprises the use of dimethylsulfoxide as solvent.

14. Process according to claim 12, wherein tris-[β-(2H-hexafluoropropoxyethyl)]-amine is the fluorine-containing tertiary amine.

15. Compound having the formula

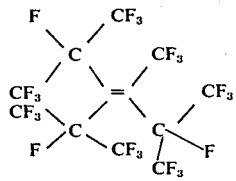

16. The process defined in claim 4 in which the fluorine-containing tertiary amine of Formula I is prepared at a temperature of 0° to 50°C, in situ, by introducing hexafluoropropene into the solution of an alkanolamine corresponding to formula

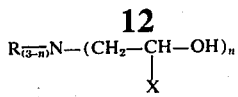

wherein $n$ is an integer from 1 to 3, X is hydrogen or $CH_3$ and R represents identical or different straight-chain, branched or cyclic alkyl groups of from 1 to 12 carbon atoms or, if $n$ is 2, additionally represents the group

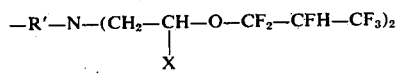

wherein R' is an alkylene group of from 1 to 12 carbon atoms, said solution comprising said alkanolamine, a trialkylamine, and an aprotic polar solvent.

* * * * *